United States Patent [19]

Esnoult et al.

[11] 4,139,394
[45] Feb. 13, 1979

[54] LININGS FOR PUSHER OVENS

[75] Inventors: Marc Esnoult, Sorgues; Michel Ayme-Jouve, Avignon, both of France

[73] Assignee: Societe Europeenne des Produits Refractaires, Neuilly-sur-Seine, France

[21] Appl. No.: 740,666

[22] Filed: Nov. 10, 1976

Related U.S. Application Data

[62] Division of Ser. No. 642,390, Dec. 19, 1975, abandoned.

[30] Foreign Application Priority Data

Dec. 26, 1974 [FR] France .................. 74 42842

[51] Int. Cl.$^2$ ............................. C04B 35/48
[52] U.S. Cl. ........................ 106/57; 106/65; 106/69
[58] Field of Search .................. 106/57, 65, 69; 432/126, 153

[56] References Cited

U.S. PATENT DOCUMENTS

| 2,424,082 | 7/1947 | Field | 106/57 |
|---|---|---|---|
| 2,438,552 | 3/1948 | Field | 106/65 |
| 2,689,119 | 9/1954 | Percy | 432/126 |
| 3,132,953 | 5/1964 | Alper et al. | 106/65 |
| 3,670,061 | 6/1972 | Nakayana et al. | 106/65 |
| 3,754,950 | 8/1973 | Cevales | 106/57 |

Primary Examiner—L. Dewayne Rutledge
Assistant Examiner—John P. Sheehan
Attorney, Agent, or Firm—Watson, Cole, Grindle & Watson

[57] ABSTRACT

The invention relates to refractory material and in particular to lining parts of the pusher ovens used in steelworks, the lining parts being made of a cast refractory material having a chemical composition $ZrO_2$, $SiO_2$, $Al_2O_3$ and $Na_2O$ (or other metal oxide) in defined proportions, but containing substantially no mullite, and furthermore has a crystallographic composition Corundum, Zirconia, Vitreous phase of defined proportions to inhibit cracking and preserve abrasion resistance.

5 Claims, No Drawings

LININGS FOR PUSHER OVENS

This is a division, of application Ser. No. 642,390, filed Dec. 19, 1975 now abandoned.

The invention relates to materials of construction for the linings of the pusher-type ovens used in steelworks.

Reheating ovens of this kind are used nowadays in steelworks for re-heating and creating uniform temperature distribution in slabs and billets before delivering them to the strip and rod tracks.

The equalizing floors of pusher ovens are of three main kinds:

Floors of composite type in which the lining consist of rails made of fused cast refractory material imbedded in a jacket of a refractory agglomerated material.

Floors with homogeneous linings consisting entirely of a fused cast refractory material.

Floors with linings of mixed type consisting of rails made of a fused cast refractory material imbedded in a jacket of another fused cast refractory material.

The type of lining chosen in a given case depends on the function and construction of the oven, on its dimensions, on the temperature to which the re-heating is taken and on the thickness and nature of the products being processed.

The fused cast refractory materials currently used in the construction of linings for pusher ovens are of two types:

The first material consist mainly of corundum, mullite and a vitreous phase. This kind of material is usually used in the form of a homogeneous lining in large, high-throughput re-heating ovens. The most-used material of this kind is sold commercially under the trade name "Magmalox". The crystallographic composition is approximately: corundum 45%, zirconia 5%, mullite 35%, vitreous phase 15%. The chemical composition is approximately: $Al_2O_3$ 75%, $ZrO_2$ 5%, $SiO_2$ 19% and $Na_2O$ 0,9%, the remainder consisting of impurities such as $TiO_2$, $Fe_2O_3$ and CaO.

Refractory lining materials of this kind, particularly "Magmalox", show a much higher abrasion resistance than the agglomerated materials, and they do not easily "grow" (this undesired phenomenon consists in the accumulation of layers of calamine adhering to the surface of the lining, making impossible to push the product through the oven), particularly if the operating conditions are appropriately selected.

The second kind of fused cast material, made mainly of corundum and beta alumina, is sometimes used in making a homogeneous lining in low-throughput ovens for slabs and in making rails in billet ovens. These refractory materials have a still higher abrasion resistance than the materials mentioned just above, but they fail to withstand comparatively severe operating conditions because they have a high coefficient of friction with the calamine, with which they react to give solid reaction products, resulting in an unacceptable degree of "growing".

The present invention relates to the new application, in making linings for pusher ovens, of fused cast refractory materials made of corundum, zirconia and a vitreous phase in suitable proportions, the cast product having improved abrasion resistance compared to the materials mentioned above based on corundum and beta alumina and showing less tendency to "growing" compared to the materials mentioned above based on corundum, mullite and a vitreous phase.

More particularly the invention relates to the application in making linings for pusher ovens of fused cast refractory materials having the following chemical and crystallographic compositions, by weight:

Chemical analysis.

| | | |
|---|---|---|
| $ZrO_2$ | 10 to 28%, | preferably 18 to 23%, |
| $SiO_2$ | 3 to 12%, | preferably 5 to 7%, |
| $Al_2O_3$ | 60 to 80%, | preferably 70 to 75%, |
| $Na_2O$ | 0.3 to 1.5%, | preferably 0.4 to 0.8%, |
| $Fe_2O_3$, $TiO_2$, CaO and MgO up to 5% in total, preferably less than 2%, | | |
| but which the previso (a) that the weight ratio $SiO_2/Na_2O$ is not more than 16. | | |

It should be observed that the $Na_2O$ can be partly or entirely replaced by technically equivalent quantities of other alkali metal oxides, as the technologist will readily understand.

Crystallographic analysis.

| | | |
|---|---|---|
| Corundum | 60 to 80% | preferably 65 to 75%, |
| Zirconia | 10 to 28% | preferably 18 to 23%, |
| Vitreous phase | 5 to 19% | preferbly 8 to 13%, |
| but with the provisos (b) corundum + zirconia + vitreous phase is at least 99%, and (c) zirconia + 2.5 times the vitreous phase is between 33 and 57.5%, preferably between 37.5 and 52.5%. | | |

The products of the invention must contain practically no mullite (3 $Al_2O_3$, 2 $SiO_2$), the proportion of mullite being in each case less than 1%. To satisfy this requirement the weight ratio $SiO_2/Na_2O$ must not exceed 16, as mentioned above.

The products having compositions within the wider ranges indicated show performances, in the floors of pusher ovens, similar or slightly superior to "Magmalox". The compositions in the preferred ranges give products whose performances are better than the performance of "Magmalox".

The materials according to the invention must contain between 60 and 80% of corundum because if there is more than 80% of corundum there is a tendency for cracks to form during the making of blocks, and there is a tendency to "growing". On the other hand, if there is less than 60% of corundum the floors are abraded too rapidly. In regard to the zirconia, this must be between 10 and 28% because above 28% zirconia the floors are abraded too rapidly and are also too costly to manufacture, due to the high price of zirconia. Less than 10% zirconia cracks tend to form. The vitreous phase must be between 5 and 19% because if it is less than 5% cracks tend to form during the making of the block and the material tends to grow. Above 19% vitreous phase the material is abraded too rapidly.

The reason why the zirconia + 2.5 times the vitreous phase must be between 33 and 57.5% is to ensure that the material has sufficient abrasion resistance for the intended application. This requirement has been determined experimentally.

A particularly preferred material according to the invention has the following compositions:

Chemical analysis.

| | |
|---|---|
| $ZrO_2$ | 21% |
| $SiO_2$ | 5.8% |
| $Al_2O_3$ | 72.7% |
| $Na_2O$ | 0.47% |
| CaO | 0.19% |

| Chemical analysis. | |
|---|---|
| -continued | |
| $Fe_2O_3$ | 0.05% |

This results in a weight ratio $SiO_2/Na_2O$ of 12.34.

| Crystallographic analysis. | |
|---|---|
| Corundum | 71.5% |
| Zirconia | 21 % |
| Vitreous phase | 8.5% |

This results in $ZrO_2$ + 2.5 times vitreous phase = 42.25.

The compositions indicated above are average compositions. The exact composition at any particular location in a block or structural part varies due to the well-known phenomenon taking place during solidification, as the technologist will understand.

It should be observed that refractory materials of the kinds described above have already been proposed, together with other materials of the system $Al_2O_3$ — $ZrO_2$ — $SiO_2$ whose compositions do not come within the scope of the present invention, in the French patent Specification No. 883,990 as being suitable in the construction of devices which have to resist attack by molten glass. But the cited French patent specification does not mention the particular application intended in the present invention, nor is it suggested. In the view of the present applicant this new application is by no means obvious, because materials for lining pusher ovens have to withstand quite special operating conditions which have nothing in common with the operating conditions to which the materials are subjected in glass-making furnaces.

Structural parts, for example blocks, for lining pusher-type ovens are made of the materials defined above by melting a batch consisting of oxides or substances which produce oxides, in proportions calculated to produce the chemical compositions indicated above. The batch can for example be melted in an electric arc furnace. The molten material is cast in molds of the desired shapes and dimensions, the cast part being subsequently re-heated and cooled under controlled conditions. The product usually consists of a compact lower region (lower in the mold), a spongy intermediate region and an upper residual region in the nature of shrinkage "pipe".

The blocks or structural parts according to the present invention make it possible to construct pusher ovens for high rates of throughput with working lives at least as long as those of ovens lined with "Magmalox" and often longer, particularly if the compositions come within the preferred range. The working face of the structural part or block is the surface of the compact region which was near the bottom of the casting mold. The parts can be used in any of the three types of oven floors mentioned above.

The following non-limiting examples are given to illustrate the nature of the invention. The percentages are all by weight.

Example 1.

This example illustrates the manufacture of a block of dimensions 60 × 25 × 30 cm made of the particularly preferred material mentioned above. The chemical composition is as follows:

$ZrO_2$: 21%
$SiO_2$: 5.8%
$Al_2O_3$: 72.7%
$Na_2O$: 0.47%
CaO: 0.1%
$Fe_2O_3$: 0.05%

The crystallographic composition is as follows:
corundum: 71.5%
zirconia: 21%
Vitreous phase: 8.5%

A batch is melted of the following composition:
alumina 69.5%
zircon sand 14.8%
(S.157* λ% zircon, 14% $Al_2O_3$, 6% $SiO_2$ approximately) 15.5%
sodium carbonate 0.2%

* this is a commercial refractory sold by the applicant.

The molten mixture is cast in a graphite mold.

After cooling and re-heating the block has an excellent appearance, both externally and internally. The compact zone extends to a height of 10 cm from the bottom of the block (relative to the mold). The spongy zone (pores 1 to 2 mm) has little thickness. The skin of the block has a light cream colour to salmon pink. The total porosity, which is almost entirely concentrated in the spongy zone and residual pipe, is of the order of 10%, which is comparable with the porosity of "Magmalox". There are no, or hardly any, internal cracks.

The material has a thermal conductivity of 0.016 Cal/cm/sec per ° C. at 700° C. The material has an excellent resistance to thermal fracture and begins to deform permanently under load at 1770° C., which is comparable with "Magmalox".

EXAMPLE 2.

This example provides a comparison between the abrasion resistance of several lining blocks according to the invention and blocks made of other materials which are outside the scope of the present invention.

The experimental method was as follows:

In an oven heated to 1300° C., the oven atmosphere being controlled at 3% CO, a ring of ordinary steel was rubbed against the surfaces of three samples of each refractory material, the ring applying a pressure of 0.150 bar. This laboratory test simulates the mechanical rubbing action encountered in industrial pusher-type ovens in the presence of oxides of iron rich in wustite.

The materials tested had the compositions indicated in the table, expressed as percentages by weight.

| Chemical analysis (impurities excluded) | | | | | | |
|---|---|---|---|---|---|---|
| Composition | A | B | C | D | E | F |
| $ZrO_2$ | 5 | 32 | 0 | 20 | 15 | 12 |
| $Al_2O_3$ | 75 | 50 | 95 | 73 | 75 | 82 |
| $SiO_2$ | 19 | 16 | 2 | 6 | 8 | 5 |
| $Na_2O$ | 0.9 | 1 | 3 | 0.5 | 0.6 | 0.5 |
| $SiO_2/Na_2O$ | 21.11 | 16 | 0.67 | 12 | 13.33 | 10 |
| Crystallographic analysis. | | | | | | |
| corundum | 45 | 48 | 50 | 71 | 76 | 80 |
| zirconia | 5 | 32 | 0 | 20 | 15 | 12 |
| vitreous phase | 15 | 20 | 2 | 9 | 10 | 7 |
| beta alumina | — | — | 48 | — | — | — |
| mullite | 35 | — | — | — | — | — |
| $ZrO_2$ + 2.5 times the vitreous phase | 42.5 | 82 | 5 | 42.5 | 40 | 29.5 |

| Chemical analysis (impurities excluded) | | | | | | |
|---|---|---|---|---|---|---|
| Composition | G | H | I | J | K | L |
| $ZrO_2$ | 26 | 20 | 20 | 20 | 20 | 20 |
| $Al_2O_3$ | 66 | 71 | 69 | 74 | 73 | 66 |
| $SiO_2$ | 7 | 8 | 10 | 5 | 6 | 12 |

-continued

| | | | | | | |
|---|---|---|---|---|---|---|
| Na$_2$O | 0.5 | 1.1 | 1 | 0.5 | 1.2 | 0.5 |
| SiO$_2$/Na$_2$O | 14 | 7.27 | 10 | 10 | 5 | 24 |
| Crystallographic analysis. | | | | | | |
| corundum | 65 | 66 | 65 | 73 | 69 | 50 |
| zirconia | 26 | 20 | 20 | 20 | 20 | 20 |
| Vitreous phase | 10 | 13 | 15 | 7 | 11 | 14 |
| Beta alumina | — | — | — | — | — | — |
| mullite | — | — | — | — | — | 16 |
| ZrO$_2$ + 2.5 times the vitreous phase | 51.0 | 52.5 | 57.5 | 37.5 | 47.5 | 55 |

In the table the composition A corresponds to "Magmalox" (a material of the type corundum — mullite — glass). This material is currently used in pusher ovens. After four days of testing the loss of thickness in the samples was measured. The samples also showed a thin deposit of iron oxide and a reaction zone where the refractory material had reacted with the iron oxide. The total thickness involved corresponded to about 3 mm of abrasion under industrial conditions.

The composition B is of the corundum — zirconia — vitreous phase type, as are the materials of the present invention, but the proportions are beyond the scope of the present invention. This kind of material (sold by the present applicant under the trade name "ER 1681"), is being used at the present time in glass-making furnaces. The samples behaved in the same general way as the samples of composition A, but the total wear depth was about 20 mm, that is to say approximately 7 times greater than the total wear depth of composition A. The material of composition B is therefore not satisfactory.

Composition C is of the corundum — beta alumina type. Tearing off the calamine sets up the mechanical stresses in the samples sufficient to rupture them in less than one hour of the test.

This corresponds to the very high tendency to "growing" which is observed in pusher ovens used for re-heating slabs. This kind of material (sold under the trade name "Jargal M") is therefore unsuitable for use in high-throughput furnaces.

The compositions F and L come near to the compositions of the present invention, but are nevertheless not included within the scope of the invention. In the composition F the quantity zirconia + 2.5 times the vitreous phase is 29.5%, that is to say less than 33%. The composition L contains 16% of mullite, that is to say too much mullite, because the ratio SiO$_2$/Na$_2$O is 24. These two compositions are defective, in that they give rise to the formation of too many cracks during the making of the blocks. Furthermore the composition F shows a high tendency to "growing".

The compositions D, E, G, H, I, J and K are of the corundum-zirconia-vitreous phase type and are included within the scope of the invention. Their behaviour is similar to the behaviour of compositions A and B, but the total abrasion depth is usually considerably less than that of composition A (the composition I, which is near the limits of the present invention, behaves in nearly the same way as "Magmalox") and much less than the total abrasion depth of composition B.

The results of the tests for wear in each test and "growing" are summarized in the table below, which also indicates the tendency in the various compositions to form cracks during the making of the constructional parts or blocks.

| Compositon | A | B | C | D | E | F |
|---|---|---|---|---|---|---|
| wear, mm | 3 | 20 | much | 1 | 1 | <1 |
| growing | none | none | much | none | little | much |
| cracks | none | none | none | none | little | much |
| Compositon | G | H | I | J | K | L |
| wear, mm | 2 | 2 | 3 | <1 | 1.5 | 3 |
| growing | none | none | none | little | none | none |
| cracks | none | none | little | little | little | much |

These results demonstrate the superiority of the materials according to the present invention compared to the materials hiterto known in the relevant technology, and compared to other materials of this general kind but which are outside the scope of the invention.

We claim:

1. A method for lining at least a portion of the floor of a pusher oven with a cast refractory material comprising providing a lining part of cast refractory material having (A) a chemical composition by weight:
ZrO$_2$: 10% to 28%
SiO$_2$: 3% to 12%
Al$_2$O$_3$: 60% to 80%
at least one alkali metal oxide: 0.3% to 1.5%

Fe$_2$O$_3$, TiO$_2$, CaO and MgO if present not exceeding 5% in total, with the proviso that the weight ratio SiO$_2$/Na$_2$O (or equivalent other alkali metal oxide) is not more than 16;

(B) a crystallographic composition by weight:
Cordundum: 60% to 80%
Zirconia: 10% to 27%
Vitreous phase: 5% to 19% with the provisos that (a) the total weight of said corundum, zirconia and vitreous phase is at least 99% of the total composition,
(b) the weight of zirconia plus 2.5 times the weight of the vitreous phase is between 33% and 57.5% of the total composition, and
(c) there is less than 1 wt. % mullite in the composition and constructing at least a portion of the floor of a pusher oven with said lining parts.

2. The method as claimed in claim 1, wherein said alkali metal oxide of the cast infractory material consists of or includes Na$_2$O.

3. The method as claimed in claim 1, wherein said cast refractory material has

A) a chemical composition by weight comprising:
Zr: 18% to 23%
SiO$_2$: 5% to 7%
Al$_2$O$_3$: 70% to 75%
at least one alkali metal oxide: 0.4% to 0.8%

Fe$_2$O$_3$, TiO$_2$, CaO and MgO if present amounting to less than 2% in total, with the proviso that the weight ratio SiO$_2$/Na$_2$O (or equivalent other alkali metal oxide) is not more than 16;

(B) a crystallographic composition by weight:
Corundum: 65% to 75%
Zirconia: 18% to 23%
Vitreous phase: 8% to 13% with the provisos that (a) the total weight of the said corundum, zirconia and vitreous phase is at least 99% of the total composition, and
(b) the weight of zirconia plus 2½ times the weight of vitreous phase is between 37.5% and 52.5%.

4. The method as claimed in claim 3, wherein said alkali metal of the cast refractory material consists of or includes $Na_2O$.

5. The method as claimed in claim 2, wherein said cast refractory material has a composition of:

$ZrO_2$: about 21%
$SiO_2$: about 5.8%
$Al_2O_3$: about 72.7%
$Na_2O$: about 0.47%
CaO: about 0.1%
$Fe_2O_3$: about 0.05%
Corundum: about 71.5%
Zirconia: about 21%
Vitreous phase: about 8.5%.

* * * * *